(No Model.)

H. R. TILLISON.
FRICTION CLUTCH DEVICE.

No. 495,440. Patented Apr. 11, 1893.

Witnesses.
Edward F. Allen.
Fred S. Greenleaf.

Inventor.
Hosea R. Tillison,
by Crosby & Gregory
attys.

UNITED STATES PATENT OFFICE.

HOSEA R. TILLISON, OF BOSTON, MASSACHUSETTS, ASSIGNOR TO THE S. A. WOODS MACHINE COMPANY, OF SAME PLACE.

FRICTION CLUTCH DEVICE.

SPECIFICATION forming part of Letters Patent No. 495,440, dated April 11, 1893.

Application filed August 24, 1892. Serial No. 443,968. (No model.)

*To all whom it may concern:*

Be it known that I, HOSEA R. TILLISON, of Boston, county of Suffolk, State of Massachusetts, have invented an Improvement in Friction Clutch Devices, of which the following description, in connection with the accompanying drawings, is a specification, like letters and figures on the drawings representing like parts.

This invention has for its object the production of an improved friction clutch device, simple in construction, possessing great strength, and adapted to be quickly operated, the same being useful as a clutch pulley or a shaft coupling.

In accordance with my invention I employ a hub having outwardly-extended radial arms to form bearings for short rock-shafts at right-angles thereto, provided with projections to actuate expansively yielding friction segments in order that they may engage the interior overhanging flange of a wheel or pulley and secure their rotation together when desired, substantially as will be described.

Figure 1:
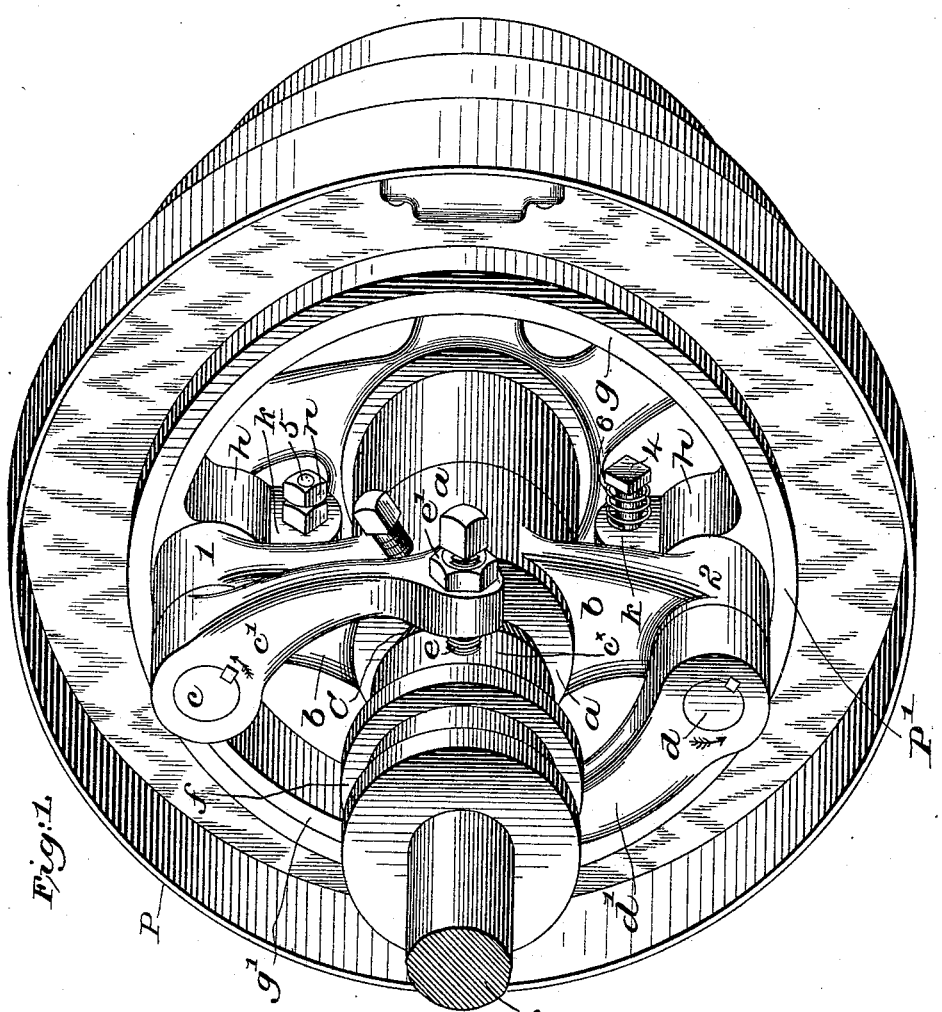
Figure 2:
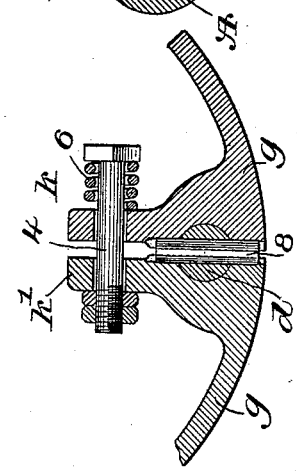

Figure 1, in perspective, shows my invention embodied in a clutch pulley. Fig. 2 is a detail, partly in section, to be described; and Fig. 3, a detail in section showing how my invention may be embodied in a friction coupling.

In Fig. 1, the main shaft A has fast on it a hub $a$ provided with rigid arms $b$, $b'$, having suitable bearings 1, 2, for short rock-shafts $c$, $d$, having at their outer ends, arms $c'$, $d'$, keyed or otherwise rigidly secured thereto. The arms $c'$, $d'$, have like friction regulating devices, shown as a screw $e$, extended therethough, only one of such screws being herein shown, it preferably having a set nut $e'$, the inner end of each screw bearing on a cone C of usual construction, having an annular groove $f$, to receive the yoke of any usual clutch lever, not shown, whereby the cone may be moved longitudinally on the shaft.

The inner ends of the rock-shafts $c$, $d$, act as supports for the ends of two segments $g$ $g$, having at their ends suitable ears $k$, $k'$, recessed as shown in Fig. 2, to receive said shafts, the ears of adjacent segments being normally drawn toward each other by suitable springs 6 to thus effect the contraction of the segments, said springs being herein represented as of the spiral class, and as surrounding and being guided by bolts 4, 5, the bolts and surrounding springs forming adjustable connections to normally draw the segments together. The rock-shafts have suitable projections, herein shown as pins 8 to act in the nature of a cam against the adjacent ends of the segments and cause their separation and expansion so that the said segments, normally of a less diameter externally than the flanged part of the wheel or pulley surrounding them, may, by their separation and slight flexure, be made to fit snugly the interior of the said flange. These rock-shafts with their projections constitute cam shafts. By turning the adjusting devices $e$ in one or the other direction, the amount of rotation of the short rock-shafts is increased or diminished, to increase or diminish the friction of the segments upon the pulley, and also to compensate for wear. The friction segments are normally drawn toward each other and from contact with the loose pulley by the springs 6, the tension of the springs being regulated by the set nuts on the threaded ends of the guide bolts.

The wheel or pulley P may be of any suitable shape externally, it having, however, an overhanging flange P'. As shown in Fig. 1, the wheel or pulley P is loose on the shaft A.

As shown in Fig. 1, the bolts 4 and 5 are extended in opposite directions, the head of one being opposite the set nuts of the other.

When the cone is pushed toward the hub or pulley P, the adjusting screws $e$ ride up on the conical surface, turning the arms $c'$, $d'$, and their attached rock-shafts in the direction of the arrows Fig. 1, the projections 8 forming separating devices, and at such time acting upon the ends of the segments $g$, $g'$, to force them apart against the action of the springs 6, thus pressing the said segments tightly against the interior of the flange P', thus causing the latter to rotate with the hub and shaft A provided the hub or pulley is being driven positively, but in case the shaft A is being driven positively the shaft will rotate the hub or pulley.

As shown in Fig. 1, the cone C has adjacent thereto a cylindrical portion $c^x$, so that when the plates are fully pressed out against the pulley, as described, the bearing screws will rest upon such portion $c^x$ and maintain the segments and pulley in operative contact. When the cone is withdrawn the various parts will return to their normal condition, under the action of the springs 6.

Figure 3:
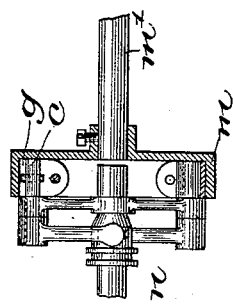

In Fig. 3 I have shown a flanged wheel or hub $m$ fast on a shaft $m'$, and the friction segments $g$, $g'$, with their separating devices as carried by a shaft $n$, in line with and adjacent to the shaft $m'$. Either shaft may be continuously rotated, and when it is desired to rotate the other shaft the wheel or hub $m$ and the friction segments are brought into engagement, the two shafts being thereby frictionally coupled together.

Having described my invention, what I claim as new, and desire to secure by Letters Patent, is—

1. A friction clutch device, consisting of a wheel or pulley having an overhanging flange, a plurality of friction segments, yielding connections at their ends, radially extended bearings rock shafts therein at right angles thereto to positively support said segments independent of the wheel or pulley, and a shaft to which said bearings are rigidly attached, combined with means to force the segments outwardly into operative engagement with the said flange, and means for adjusting the yielding connections, substantially as described.

2. A rotating shaft, a series of rock-shafts parallel thereto and having cam projections, located between the ends of and adapted to separate and also continuously support adjacent friction segments independent of the wheel or pulley, bearings for said rock-shafts extended radially from and secured to the rotating shaft, combined with friction segments, connections, comprising headed bolt-like guides extended loosely through said segments, and adjustable springs on said bolts, between their heads and the segments, to normally draw said segments together, a wheel or pulley surrounding said friction segments loosely, and means to actuate said rock-shafts in their bearings and separate the friction segments to engage the wheel or pulley, substantially as described.

3. A flanged wheel or pulley; friction segments to engage the same provided with recessed ears at their adjacent ends, and cam shafts extended between said ears and seated in the recesses to force said segments into engagement with the said wheel or pulley, said wheel or pulley and segments being normally rotatable one with relation to the other and connections between said segment ears; combined with independent bearings for said cam shafts; a cone; and adjustable connections between it and said cam shafts to actuate the latter, whereby said friction segments and wheel or pulley are brought into operative engagement one with the other to rotate in unison, substantially as described.

In testimony whereof I have signed my name to this specification in the presence of two subscribing witnesses.

HOSEA R. TILLISON.

Witnesses:
  GEO. W. GREGORY,
  EMMA J. BENNETT.